June 17, 1958 — E. BÜRGER — 2,838,983
PHOTOGRAPHIC LENS SHUTTER
Filed Nov. 18, 1952 — 7 Sheets-Sheet 1
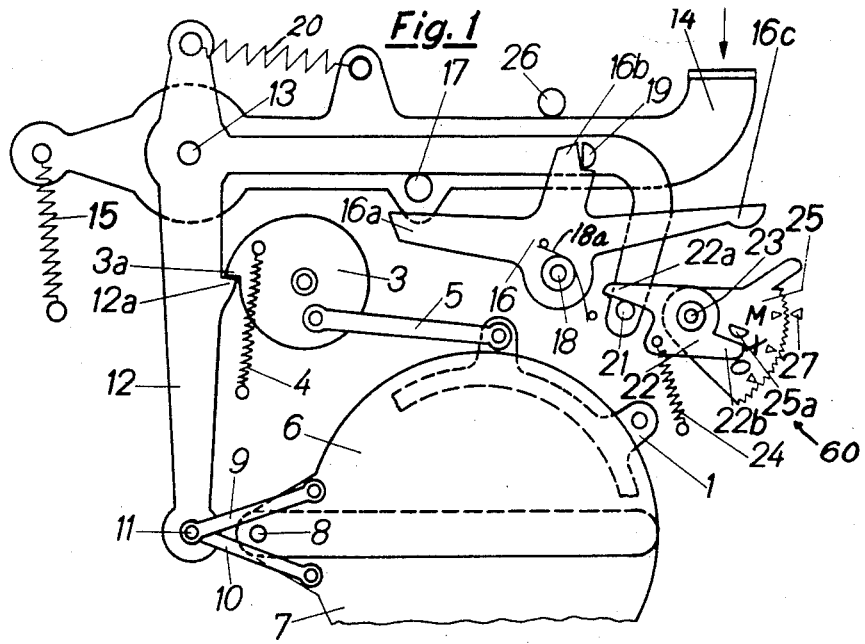
INVENTOR
ERICH BURGER
By Connolly and Hutz
HIS ATTORNEYS June 17, 1958  E. BURGER  2,838,983
PHOTOGRAPHIC LENS SHUTTER
Filed Nov. 18, 1952  7 Sheets-Sheet 2
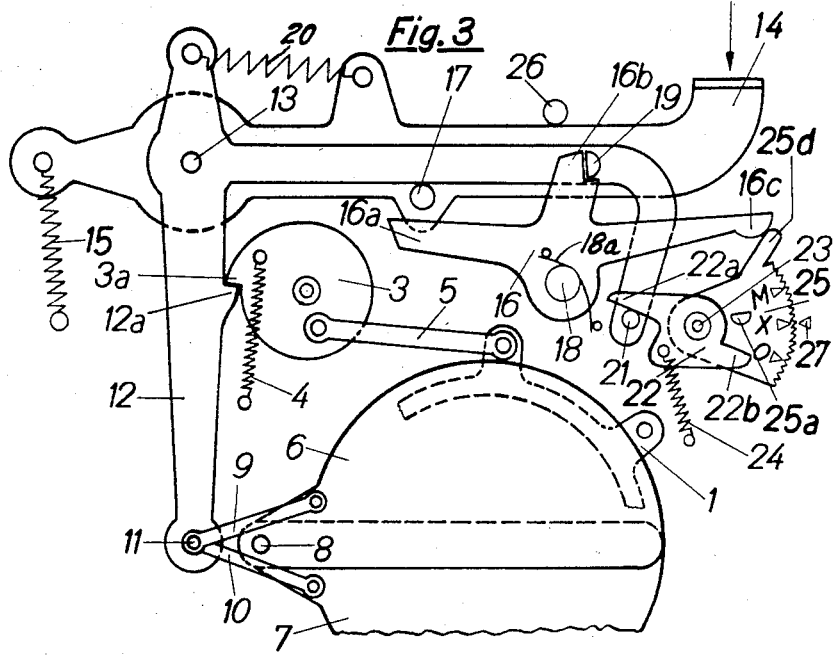
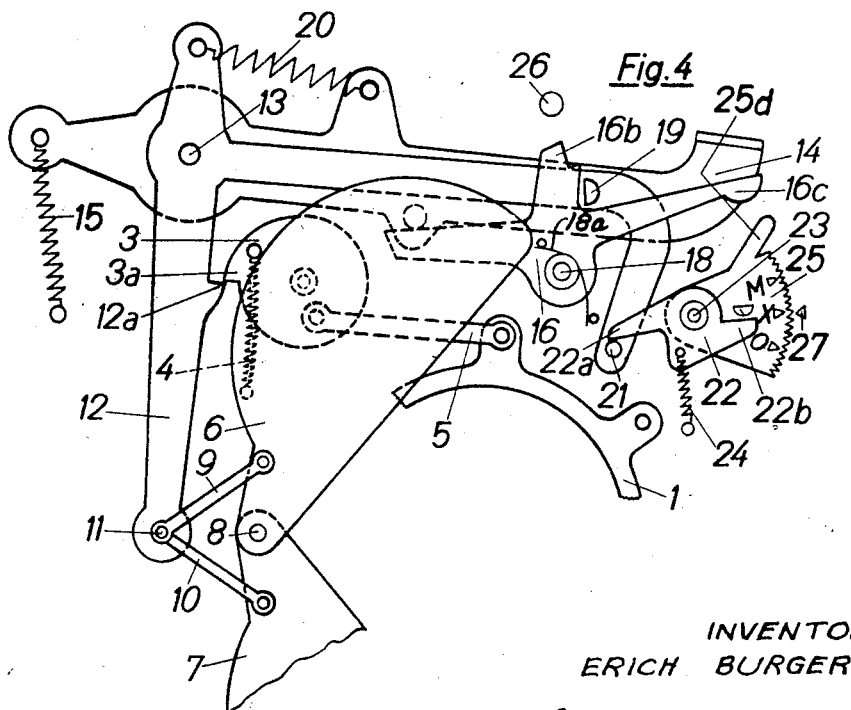
INVENTOR
ERICH BURGER
By Connally and Hutz
HIS ATTORNEYS June 17, 1958 — E. BURGER — 2,838,983
PHOTOGRAPHIC LENS SHUTTER
Filed Nov. 18, 1952 — 7 Sheets-Sheet 3

INVENTOR
ERICH BURGER
By Connolly and Hutz
HIS ATTORNEYS

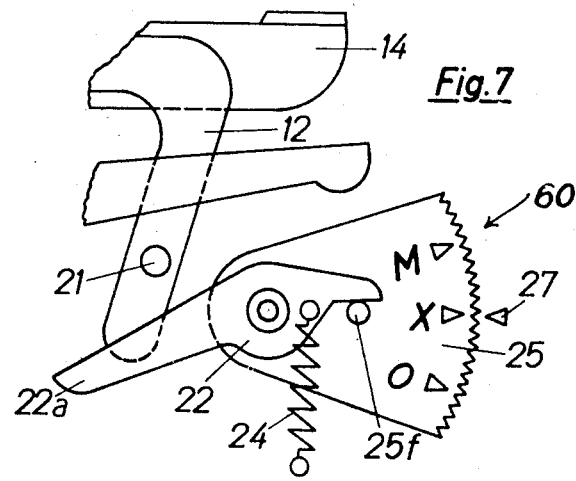
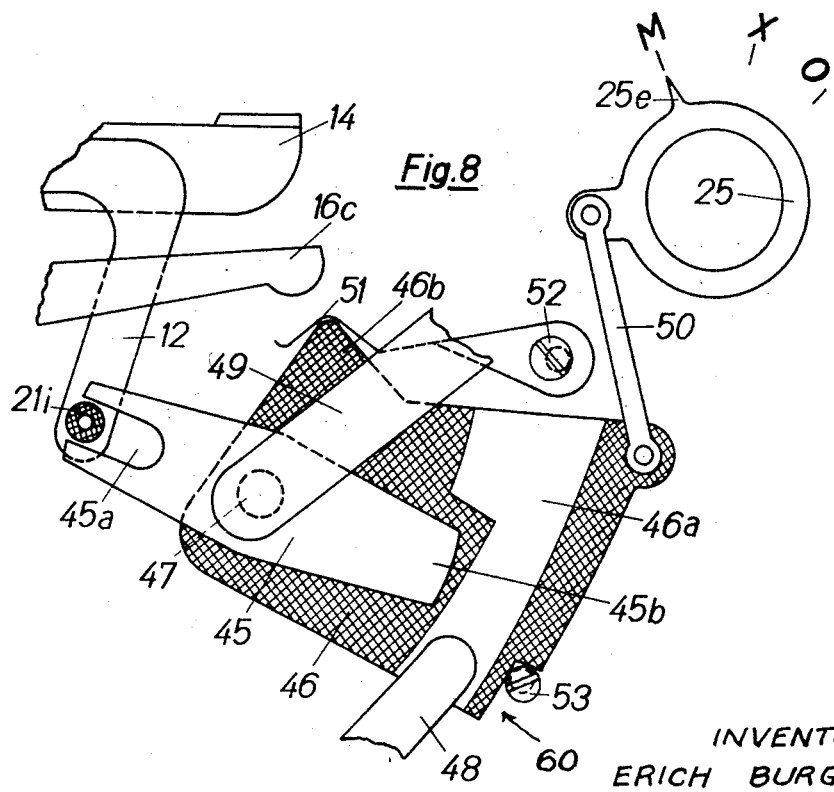

June 17, 1958     E. BURGER     2,838,983
PHOTOGRAPHIC LENS SHUTTER
Filed Nov. 18, 1952     7 Sheets-Sheet 5
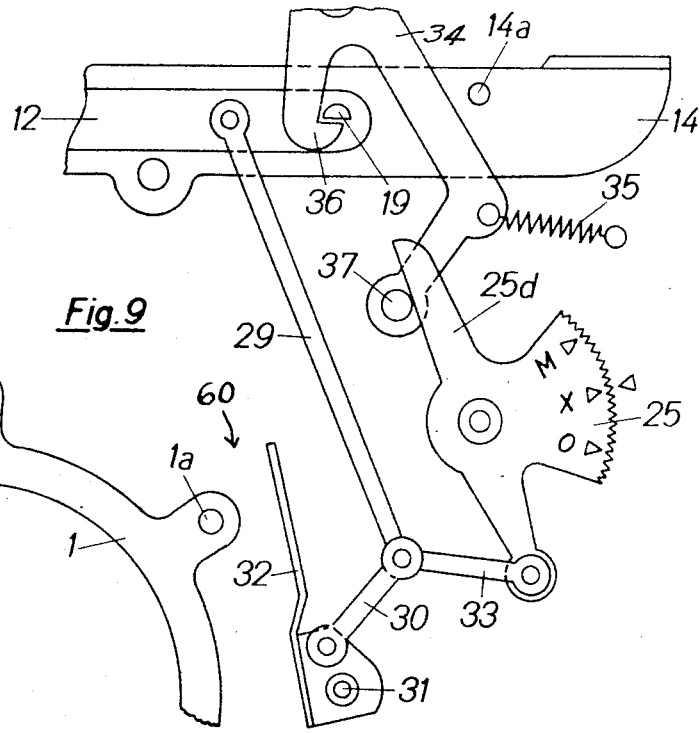
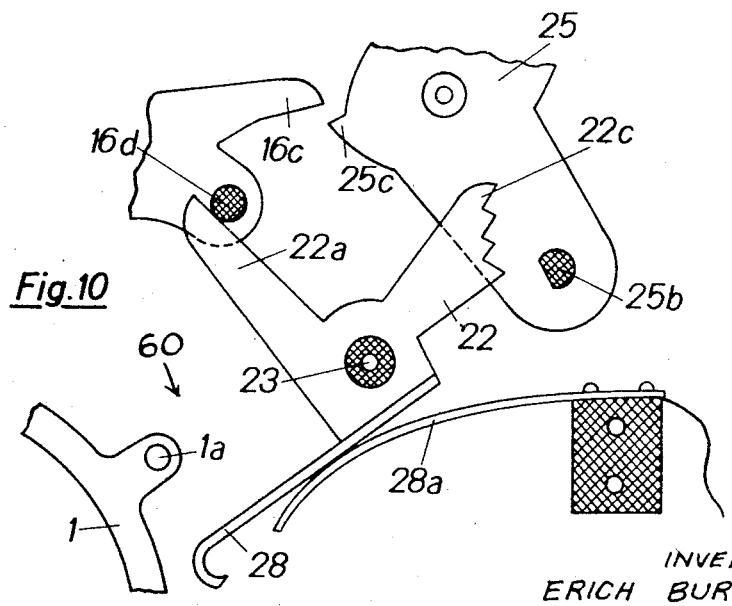
INVENTOR
ERICH BURGER
By Connolly and Hutz
HIS ATTORNEYS United States Patent Office 2,838,983
Patented June 17, 1958

2,838,983
PHOTOGRAPHIC LENS SHUTTER
Erich Burger, Munich, Germany
Application November 18, 1952, Serial No. 321,197
Claims priority, application Germany December 8, 1951
11 Claims. (Cl. 95—11.5)

The invention relates to a lens shutter for photographic cameras, and more particularly, to a tensioning shutter type which is provided with closing lamina or sectors, as well as with pivoted covering sectors. Specifically, this invention is concerned with a new lens shutter mechanism which is also particularly adapted to synchronously or sequentially initiate an auxiliary function, such as to energize photoflash lamps at a predetermined time relative to film exposure.

The invention also relates to a simplified and less expensive form of a flashlight switch, which is built into the shutter casing and intended for igniting both flashtubes and flashbulbs with a single pair of contact parts.

In conventional cameras, the covering sectors or blades of the assisting or supplemental shutter are generally located in front of the closing lamina, when viewed in the direction of the introduction of light, and are usually set to open shortly before the exposure of the film through the closing lamina. They also close again shortly after the actuation of the closing lamina. Such double acting shutter mechanisms are commonly employed in high speed cameras wherein the closing lamina are constructed to be very thin because of the extraordinarily strong accelerations to which they are subjected and where there is danger that a weak preexposure may take place through the thin closing lamina. Such an arrangement is also necessary in the case of tension shutters with unconcealed winding.

It has long been a major problem when using such type tensioning shutter cameras to provide simple, effective and accurate control means for initiating the energization of the photo-flash bulb or flashpan circuit in the proper timed sequence with an opening of the shutter mechanism. This problem had been compounded in double shutter mechanisms by the fact that any correlating control structure must inherently preclude the addition of any dead weight to the shutters or their immediate actuating elements.

It is therefore a main object of the instant invention to provide a shutter mechanism which includes suitable means for actuating the photoflash lamp of the camera without unduly burdening the actuating linkage of the shutter operating elements. A further object is to provide a novel double acting shutter mechanism having an adjustable photoflash actuation movement. Another object is to provide a camera switch unit which may be operated directly from the camera release member. Other and distinct objects will become apparent from a description of the claims that follow.

The invention will be described with particular reference to double acting shutter mechanisms of the tensioning type, but it will be understood that it applies to other types as well. It has been found that these double acting shutter mechanisms are according to this invention very well suited for the incorporation of a flashlight switch unit which may be controlled by the shutter mechanism in such a manner that the period of full light emission from the flash will coincide with the instant of full shutter opening. For this purpose, the covering blades of the assisting or supplemental shutter may either directly or indirectly actuate a switch for ignition of a flashlight lamp or flash tube in synchronism with the opening of the main shutter. Further, the time interval between the initial make contact of the flashlight switch and the opening of the shutter mechanism may be adjusted; or if desired, the adjustment may completely eliminate actuating of the flashlight switch.

According to the invention the release member of the shutter mechanism actuates the driving element of the supplemental sectors and the driving element in turn actuates the flashlight switch and the main shutter lamina. The driving element for the supplemental sectors thus functions as a relay between the release member and the main shutter. The actuation of the individual shutter members may take place directly or indirectly. In this form of the invention no special delay mechanism is required in order to attain any desired delay between the making of contact of the flashlight switch and the opening of the shutter sectors, this function being assumed by the supplemental shutter.

Instead of using a single driving element for the supplemental shutter it is advantageous to provide an intermediate lever between the driving element and the supplemental shutter. Thus the delay of the system for the ignition of flash tubes only depends on the inertia of the intermediate lever which enables the exact timing of said relatively fast action.

In one of the forms of the invention, one contact member of the flashlight switch is resiliently biased to close the switch as soon as the driving element for the supplemental shutter frees this contact member. The other contact member may rest upon an adjustable disc, actuated externally of the camera; or it may be arranged upon the driving member of the supplemental shutter mechanism itself. If desired, it is also possible to mount this second contact member upon the shutter lamina ring and to bring it in contact with the resiliently biased contact member earlier or later, depending upon its position on the ring which may be varied by adjustment.

In another desirable form of the invention, the contact members are both made movable relative to each other.

It is essential for the double shutter arrangement according to the invention that the release member or actuator for the shutter be figuratively, to a certain extent, broken up or separated into two separately operating parts of which the first part serves for direct actuation by the finger, while the second part performs three distinct sequential functions; namely, (a) to drive the supplemental shutter, (b) to actuate directly or indirectly the flashlight switch, and (c) to release the main shutter. The specific construction of the individual transmission members is of no critical significance in the broad substance of the invention.

Having disclosed the invention generally reference will now be made to various specific embodiments which are illustrated by way of example in the drawings, and in which:

Fig. 1 is a schematic elevation view of the double acting shutter mechanism and the flashlight switch with one switch setting and before the release.

Fig. 2 shows the positions of the shutter and other elements after the release of the supplemental shutter and the actuation of the flashlight switch, but before release of the main shutter.

Fig. 3 is a schematic elevation view of the double acting shutter mechanism upon adjustment of the flashlight switch to a second setting and before the release.

Fig. 4 illustrates the positions of the shutter mechanism elements of Fig. 3 immediately after release of the supplemental shutter but shortly before actuation of the flashlight switch and of the main shutter.

Figure 11:
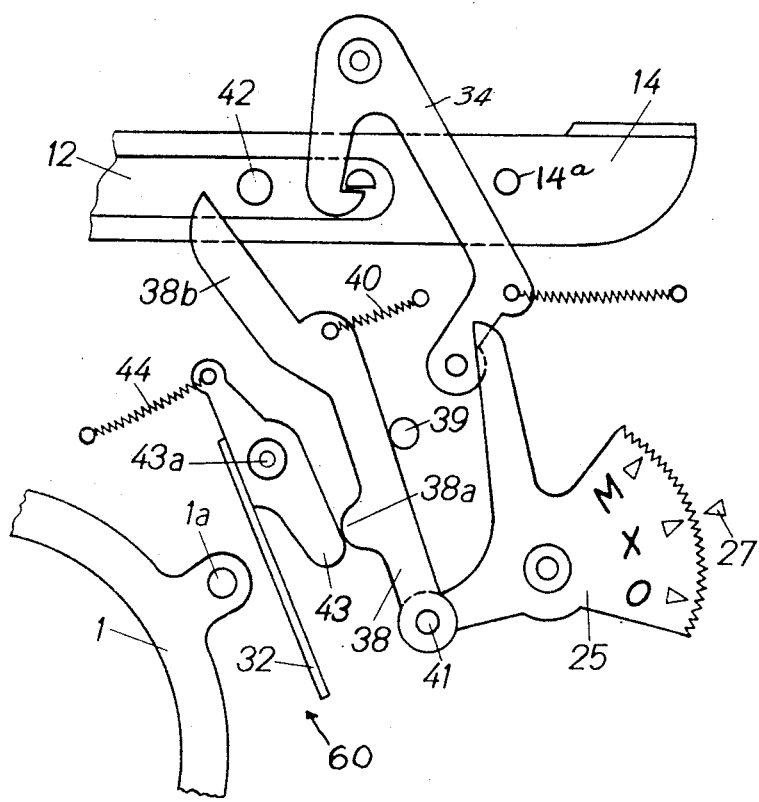
Figure 12:
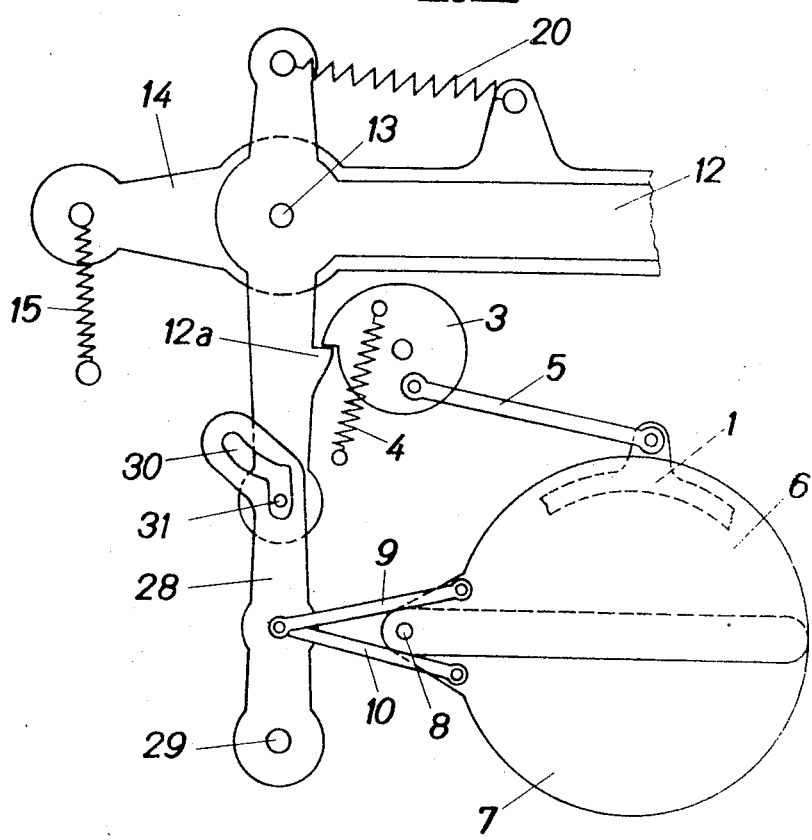

Figs. 7 to 11, inclusive, illustrate diverse modifications of the invention; and Fig. 12 shows a supplemental mechanism for the shutters according to Figs. 1 to 11.

With reference to Figs. 1 and 2, the shutter blade cam ring 1 which operates the shutter sectors 2 of the main shutter is driven by means of a main driving element 3 under the effect of a spring 4 in a to-and-fro type of movement to periodically expose the photosensitive film (not illustrated). A link 5 serves as a transmitting member between the driving member 3 and the shutter blade ring 1.

In front of the sectors 2 of the main shutter there are arranged two covering sectors 6 and 7 of a supplemental shutter unit. These covering sectors turn about pivots 8 and are spread open and closed by means of levers 9 and 10 which are mounted about a shaft 11 of a second driving element 12. The driving element 12 comprises a crank arm mounted to rotate about a pivot pin 13 and has numerous functions. The depending arm of the crank 12 carries a laterally extended nose element 12a which is adapted to cooperate with a pip or segment 3a on the driving disc element 3 and functions as a latch to hold the driving element 3 against the tension of spring 4 with the shutter lamina or segments 2 in their closed position through the intermediate connections of link 5 and cam ring 1.

An actuator or release lever 14 is also mounted to rock about the pivot pin 13 and is biased to an up position determined by a stop 26, by the action of a spring 15. The lever 14 is connected to the crank arm 12 to operate the latter through a tension spring 20 in a manner to be described. Lever 14 also includes a stop element 17 which projects into the line of movement of the horizontal arm or crank 12 and limits its clockwise movement about pivot pin 13 under the influence of spring 20. A rocker member or trip lever 16 is mounted below lever 14 and includes oppositely extending arms 16a and 16c and an upwardly extending latch arm 16b. This rocker lever is pivoted to rotate about a pivot pin 18 and is normally biased to the position illustrated by a spring 18a. In the position illustrated in Fig. 1, latch 16b cooperates with an extended pin 19 carried by the upper arm of crank 12 to positively block clockwise rotation of crank 12.

The upper arm of crank 12 terminates in a downwardly directed tailing end which carries a second extended peg or pin 21 which is adapted to cooperate with an adjustable switch unit 60 connected in the electric circuit of the photoflashlight. The adjustable disc member 25 which is positioned to rock about an axle 23 and includes an extended locking element 25d located at one end of its arcuate periphery and an integral contact member 25a which is adapted to be connected in circuit with the photoflashlight. On the periphery of the adjustable disc segment are found a plurality of serrations. The adjustable disc is serrated at its periphery and carries three indicia M, X, O. The marking includes adjacent center indicators in the form of arrows or the like and is adapted to cooperate with a fixed position indicator 27 carried by a convenient section of the remaining camera structure (not presently illustrated). A double arm lever 22 is also mounted to rock about the axle 23 and is positioned to overlie the disc 25. The arm of the lever 22 includes an actuating arm or nose 22a which is adapted to cooperate with the locking pin 21 carried by the upper arm of crank 12, and a switch arm 22b which integrally carries a second contact element and in cooperation with the switch element 25a functions to complete the energization of the flashlamp. A spring 24 is connected to the double arm lever 22 and normally tends to continuously bias the lever 22 to a position wherein the switch contact on the arm 22b will engage a switch contact 25a on the disc segment 25. As shown in Fig. 1, however, counterclockwise movement of the lever 22 under the actuating spring 24 is normally prevented by the latching action of pin 21.

Having generally described the structure comprising the novel double acting shutter mechanism of the instant invention, reference will now be made to the particular manner in which the same operates. With reference to Figs. 1 and 2, it will be noted that a pressure is exerted upon the release lever 14 in the direction of the arrow shown in Fig. 1, the release lever being depressed to the position shown in Fig. 2 and the peg 17, carried by the release lever, depresses the arm 16a of trip lever 16 to cause the lever to rotate about peg 18 and thereby displace the arm 16b in a counterclockwise direction. With this movement of rocker member 16, the peg 19 on the driving element or crank arm 12 of the supplemental shutter unit will fall into the position shown in Fig. 2 under the action of spring 20 which is attached at one side to the driving element 12 and at the other side to the release lever 14. After the pin 19 of driving element 12 is released from the notch in the latch arm 16b, the peg 21 on the tailing end of driving element 12 releases the nose 22a of the double armed lever 22 which may then turn about axle 23 under the influence of spring 24, so that lever 22 may lie with the arm 22b against the contact 25a of the adjusting disc 25. The abutting of arm 22b and the peg 25a mates the respective contacts of the flashlight switch and energizes the circuit current for a flashlight lamp fed by means of a battery (not illustrated).

In Figs. 1 and 2, the adjusting disc segment 25 is set at M, i. e. for actuation of a vacuum flashlamp. In this position the current circuit is closed by the contacts on 22b and 25a before the latching nose 12a of the driving element for the supplemental shutter has released the nose 3a of the driving element 3 of the main shutter. The mass of the covering sectors 6 and 7, as well as of the driving lever, is so great that about twenty-thousandths of a second elapses between the making of contact and the full opening of the main shutter.

This feature constitutes one of the main advantages of this form of the invention in that a special delay mechanism for attaining a time delay between the making of contact of the flashlight switch and the full opening of the shutter is rendered unnecessary. It should also be noted that upon the release of release lever 14 it will return to its original position due to the effect of the spring 15; the lever 14 will then be held against the peg 26 in position for subsequent actuation.

Figure 5:
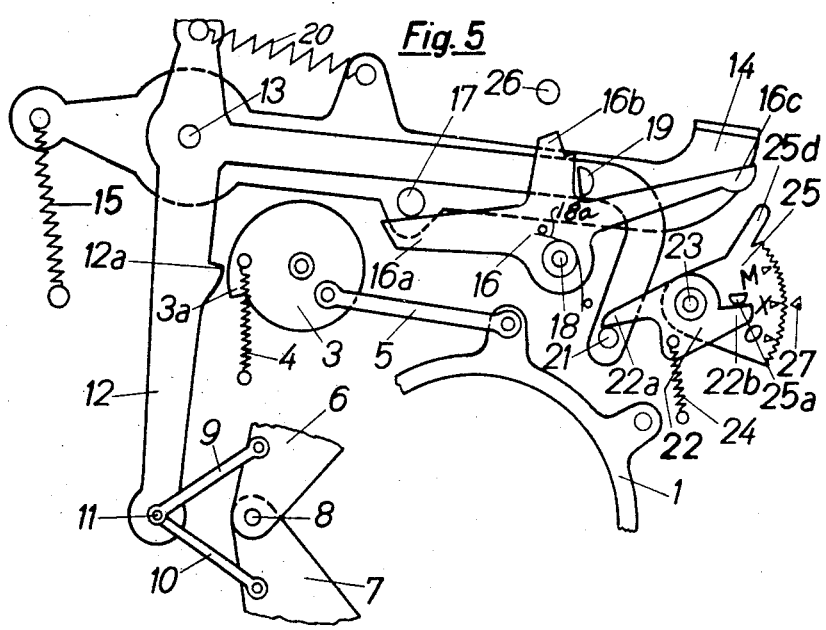
Fig. 5 shows the shutter mechanism of Figs. 3 and 4 at the point of full opening of the main and supplemental shutters and of the simultaneous actuating of the flashlight switch.

Figs. 3 to 5 inclusive illustrate the shutter mechanism when the switch unit 60 is adjusted for the so-called electron flashes, also called flash tubes. In this operation, the adjusting disc 25 of the flash light switch 60 is set with its indicia mark X opposite the fixed or zero mark 27, and the switch contact 25a assumes a position which is further removed from the opposing contact carrying arm 22b of the contact lever 22. If one now presses upon the release lever 14 of the shutter with this switch adjustment, a making of contact between the contact peg 25a and the contact arm 22b will only take place when the main shutter is fully opened. As illustrated, Fig. 4 shows the shutter mechanism elements in the positions equivalent to Fig. 2, but due to the new setting of the disc 25, the switch contacts will not meet until the shutter mechanism reaches its fully open position of Fig. 5. It must be noted that the mark X on the disc 25 must be placed such, that this has to be achieved despite the fact, that the two systems, on the one hand the shutter mechanism, consisting in our example of the master-member 3, push rod 5 and blade ring 1 and the shutter blades not shown, driven by the spring 4, and on the other hand the supplemental shutter and synchronizing system consisting of driving member 12, push rods 9 and 10, cover blades 6 and 7 driven by spring 20, are independent from the time the master member 3, is released. This adjustment is easily possible, because the switch according to the invention is continuously adjustable. The correct timing of the action of the two systems is facilitated by the arrangement according to Fig. 12, which will be described later. In the Fig. 4 position, the shutter elements have moved so that the driving element 12 is already released by the latch arm 16b but has not yet reached its lowest position. The latch nose 12a of the driving lever is just tearing off from the pip 3a of the main driving element 3, and the contact parts 25a and 25b are still separated by a small distance from each other.

Figure 6:
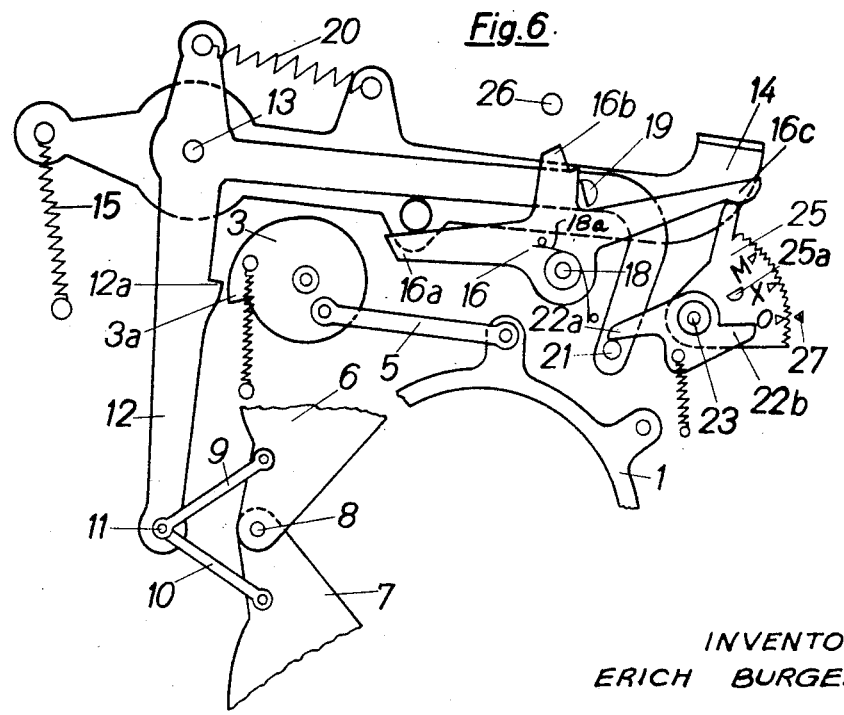
Fig. 6 illustrates the shutter mechanism elements in the fully open positions but with the flashlight switch adjusted to a non-operating setting.

Fig. 6 illustrates a further position setting of the switch unit 60 in which the flashlight switch has been shut off, i. e. the mark 0 of the adjusting disc 25 is now located opposite the fixed mark 27. In this position the arm 16c is locked or held by the extended cam arm 25d of adjusting disc 25 so that the arm 16c releases pin 19, and driving member 12 can follow pin 17 as soon as lever 14 is depressed. In other words, in this case lever 14, spring 20, lever 12 and pin 17 on lever 14 constitute a unit which moves without delay or lost motion.

Fig. 12 illustrates a supplemental mechanism according to the invention wherein it may be advantageous, instead of employing a one-part driving element 12 to provide an intermediate lever 28 between the covering sectors 6 and 7 and the operating crank or lever 12. This intermediate lever is mounted to rotate about a fixed axis 29 and possesses a slit 30 in its upper part into which projects a peg 31 carried by the lever 12. The covering sectors 6 and 7 are connected with the intermediate lever 28 in a pivotal joint-like fashion through levers 9 and 10.

The use of intermediate lever 28 has the effect that the period of time delay between the release of the driving element 3 for the main shutter until the making of contact of the flashlight switch, for a given adjustment corresponding to X (see Fig. 5) is dependent solely upon the inertia of the lever 12. The movement of the lever 12 may thus readily be coordinated with the movement of the main shutter due to its slight mass and lower friction at the peg 13. The form of the slit 30 in the intermediate lever 28 is so chosen that the masses delaying lever 12 are rendered smaller after full opening of the covering sectors 6 and 7. Thus the correct timing of the movement of lever 12 and master member 3 is facilitated, because it is much easier to tune up the movement of one single lever with the movement of the shutter system than to tune up the whole supplemental shutter system containing the cover blades with their relatively high friction. This innovation makes it possible actually to render the synchronizer and shutter movements independent from each other and insures an extreme rapidity in the opening movement of the main shutter sectors which approaches that of a snap action.

It will be obvious to those skilled in the art that the double acting shutter mechanism of the instant invention, while being specifically described with reference to an auxiliary actuating function in initiating the energization of a photo flashlight, may also be adapted for use in initiating any of the other various auxiliary functions in photographic cameras of different types which must be performed in predetermined timed synchronism with the opening and closing movements of the camera shutter mechanism. For example, the auxiliary mechanism 60 may be adapted to control a timing recording circuit wherein various exposure times for the films may be accurately recorded for subsequent comparison with the films as developed to determine the proper exposure time which should ultimately be used.

One of the primary advantages of the instant invention, regardless of the specific form it may take due to different considerations involved in the selection of the transmission linkages, resides in the provision of an auxiliary actuating structure which may be operated in predetermined time sequence with either of the shutter units without interposing any added mass inertia to delay operation of such shutter units.

However, in some instances it may be desirable to incorporate one element of the switch mechanism as an integral part of the cam ring 1 for the main shutter segments. In such case the adjustable switch contact disc 25 may be positioned adjacent the ring 1 and adjusted to various spatial relations to the contact carried by the ring. A more desirable innovation, however, would be to mount the switch actuating unit 60, in toto, adjacent the blade ring 1 and to mount an abutment pin on such cam ring similar to the pin 21 whereby movement of the ring 1 would permit the biasing element 60 to bring about mating of the switch contacts in like manner to that previously described.

As will be apparent from an inspection of Figs. 1 through 6 inclusive and 12, it will be noted that the upper portion or arm of the operating crank 12 is released from the biasing or retarding action exerted upon it through the effect of spring 24, arm 22a and pin 21 upon the mating of contact elements 25a and 22b. No gross discontinuity in the rate of movement of crank 12 will occur, however, due to the fact that the added inertia of the supplemental shutter sectors 6 and 7 functions as an inertia delay or brake device.

However, it is desirable to provide a switch actuating unit which may be used with the operating linkage of single shutter cameras, as well as with double acting shutter cameras, in which the shutter opening movement of an operating lever is constantly controlled by a predetermined inertia load or braking action. When used with single shutter mechanisms such switch unit may constitute the entire inertia delay or braking function, while conversely, when used with double acting shutter mechanism, it may supplement and assist the inertia function accorded by the supplemental shutter sectors. Figs. 7 through 11 inclusive are examples of various type modifications suitable for this purpose.

In Fig. 7 the adjustable switch unit 60 is constructed in a manner similar to that illustrated in the preceding example and includes an adjustable base disc 25, and mounted on it a pivoted two-armed contact lever 22. In this instance, however, the lever 22 is formed with a contact arm portion 22a extending into the path of movement of pin 21 carried by the lever 12 and is constantly resiliently biased towards engagement with such pin by a spring 24 connected to the lever 22 on the other side of its pivot or fulcrum. The base disc 25 carries a stop pin 25f which engages the other extending arm of the lever 22 and functions to limit the clockwise movement of the arm under the influence of spring 24. The pin element 21 and the elongated arm 22a constitute the switch in this form of the invention and are adapted to remain in contact throughout relative movement between crank arm 12 and lever 22 during the actuation of the camera shutter mechanism or mechanisms.

Fig. 8 illustrates a further embodiment of the invention wherein the switch unit 60 comprises a separate operating or adjustment dial 25 of an indicator which in turn is connected to a rockable and adjustable contact bearing link plate 46 through a pivotally connected link 50. The adjustable link member 46 is in the form of a plate and has a major portion of its surface covered by an insulated material with a relatively narrow contact strip 46a having good electrical conductivity positioned near one end thereof. The link plate pivotally mounts a lever 45 by means of a pivot pin 47. This lever has a contact arm 45b at one end and a slotted yoke 45a at the other end and is adapted to be operated from the lever arm 12 through the interconnection of insulated pin 21i with the yoke 45a. Separate stationary contact fingers 48 and 49 are positioned to contact the respective surfaces of the lever 45 and the contact strip 46a and complete the connection to a power source and the load element (not illustrated). The link plate 46 has an extended nose section 46b which is adapted to bear against a spring 51 which forms a rest or support for the plate 46. The spring 51 and link plate 46 can be very precisely adjusted relative to one another through openings in the shutter housing (not illustrated) by means of eccentric guide pins 52 and 53.

The construction of the linkage mechanism is such that the lever 45b and link plate 46 tend to cooperate together as toggle links when the operating crank arm 12 is displaced to pivot lever 45 about pivot 47. This action has a tendency to cause relative movement between the lever 45 and the plate 46. The photoflash circuit is energized when the contact arm 45b wipes across the enlarged portion of contact strip 46a. The timing of this latter action may be accordingly predetermined by adjustment of elements 25, 52 and 53. Upon adjustment of the dial 25e to the position O, the link plate 46 is pivoted upwardly to a position where the arm 45b, under the influence of lever arm 12 and pin 21i, will not coincide with any portion of the contact strip 46a and the nose section 46b lifts up the lever arm 16b as previously described.

In the embodiment illustrated in Fig. 9, the driving arm 12 drives a contact arm 32, which is pivotable about its axis 31, by means of a lever system 29, 30 and 33. One switch contact pin or peg 1a is positioned upon the shutter blade ring 1, while the other contact 32 is connected by the lever system 29, 30 and 33 to make connection with the adjusting disc 25 of the flashlight switch. A lever 34 having the same function as the lever 16 of the previous embodiments according to Figs. 1–8 is mounted to block arm 12 and is pressed aside against the action of a biasing spring 35 by means of a peg 14a upon the release lever 14. This action moves the hook 36 of lever 34 from under the peg 19 and releases it, whereupon the driving element 12 moves downwardly.

The lever arm movement permits the time of making contact between the parts 1a and 32 to take place earlier or later depending upon the adjustment of the disc 25 whose arm 25d lies against the peg 37 of the lever.

Fig. 10 illustrates a further embodiment of the invention in which a switch contact peg 1a is arranged on the shutter blade ring 1 and is adapted to cooperate with a second switch contact spring 28 carried by a contact lever 22. In this embodiment a peg 25b on the adjusting disc 25 serves as a stop which, depending upon the adjustment of the disc 25, falls into one of the steps 22c of the contact lever 22. By means of these steps various ignition periods can be set to accommodate the various characteristics of the flash lamp types.

The arm 22a of the switch contact lever 22 bears against an insulated peg 16d carried by the lever 16 (see Fig. 1) through the action of resilient arm 28 which is positively biased in a clockwise direction by a second resilient current conducting contact tongue 28a. The operation of this arrangement is similar to those previously described in that movement of arm 16c carries pin 16d in a counterclockwise direction to permit contact 28 to move into position to mate with contact 1a. Upon adjustment of the flashlight switch to position M, the switch contact arm 28 may touch the contact pin 1a before starting movement of the shutter blade ring 1; while with adjustment of the disc 25 to position X the contact pin 1a strikes against the spring 28 only upon full opening of the shutter sectors. Upon adjusting the disc to position O, the nose 25c lifts the arm 16c of the three-armed lever 16 (see Fig. 1) so far that the peg 19 on the driving element 12 no longer lies in the path of the arm 16b of the lever 16 (compare with Fig. 6).

In Fig. 11 there is shown a still further variation of this last embodiment of the construction of switch unit 60, and in this case there is no direct connection between the driving arm 12 and the adjusting disc 25. Instead an intermediate lever 38 is positioned to bear against a stop peg 39 under the action of the spring 40, and includes an elongated nose end 38b which projects into the path of movement of a pin 42 carried by the operating or driving crank arm 12.

The intermediate lever 38 is also pivotally connected to the adjusting disc 25 at the point 41 and moves toward and away from pin 42 through adjustment of disc. 25.

A protuberance 38a is provided on lever 38 and normally bears against an end of a pivoted switch contact lever 43, pivotally about an axis 43a. The latter lever carries an integral switch contact element 32, adapted to mate with an opposing contact 1a on ring 1, and is normally biased against protuberance 38a by a spring 44. The remaining elements 14, 14a and 34 are identical in structure and operation to those illustrated in Fig. 9. Upon pressing down the release lever 14 the peg 42 upon the driving arm 12 presses the uppermost free end 38b of the lever 38 aside and thereby causes the making of contact between the contact tongue 32 and the contact peg 1a upon movement of lever 43 against the bias of spring 44.

It will be readily appreciated that the construction of the switch contacting elements as having simultaneous movement relative to one another during the shutter opening movement provides a unique solution to the problem of controlling the rate of shutter movement in a predetermined manner. Thus, for example, the construction of Fig. 7 permits the initial time interval for the energization of the photoflash lamp to be controlled via disc 25 and lever 22, while at the same time readjusting the spatial position of the lever to permit the contact members 21 and 22a to bear a predetermined retardation in the continued movement of arm 12. A further distinct advantage of this form of the invention resides in its suitability for use with shutter mechanisms of various types, either single or double.

As many apparently widely different embodiments of the above invention may be made without departing from the spirit and scope hereof, it is to be understood that this invention is not limited, except as defined in the appended claims.

What is claimed is:

1. A photographic camera shutter and flash actuating mechanism comprising a manually actuated release lever, an intermediate lever, resilient means coupling said intermediate lever to said release lever latch means operatively coupled to said intermediate lever for holding said intermediate lever motionless until said manually actuated release lever moves a distance sufficient to tension and cock said intermediate lever, said release lever including actuating means which contacts said latch means to release said intermediate lever after said release lever has moved said tensioning distance, a flash-controlling switch means including a pair of contacts, a shutter-driving means, said intermediate lever including means for releasing said shutter-driving means and means for actuating said switch means, preselectable means for adjusting the position of a contact of said switch means to cause said switch to close at times varying from before the time of release of said shutter-driving mechanism to times relating to full shutter opening and thereafter, and said preselectable means being operatively engaged with said latch means when it is set for a daylight exposure to permit said intermediate lever to freely follow the movement of said manually actuated release lever and to prevent inadvertent closure of said switch.

2. A photographic camera mechanism as set forth in claim 1 wherein a supplemental shutter mechanism is operatively coupled to said intermediate lever, the inertia of said supplemental shutter mechanism reacting upon said intermediate lever to govern the delay between the time of closure of said contacts and release of said shutter-driving mechanism.

3. A photographic camera mechanism as set forth in claim 2 wherein a link is provided to actuate said supplemental shutter mechanism, said link being coupled to said intermediate lever by peg and slot means, said peg and slot means being arranged to permit said intermediate lever to move free of said link after said shutter driving mechanism is released for an "X" exposure to cause the delay of closing of said switch contacts after release of said shutter-driving mechanism for said "X" exposures to be dependent upon the inertia of said intermediate lever and independent of said link and supplemental shutter mechanism.

4. A photographic camera mechanism as set forth in claim 1 wherein said latch means is provided by a trip lever, and said release lever includes a projection disposed for rotating said trip lever to free said intermediate lever from said latch means after said release lever has moved said predetermined distance to tension said intermediate lever.

5. A photographic camera mechanism as set forth in claim 1 wherein said flash-controlling switch means reacts upon said intermediate lever to apply a force to govern the delay in time between closure of said switch contacts and release of said shutter-driving mechanism.

6. A photographic camera mechanism as set forth in claim 1 wherein said preselectable means is carried upon an adjustable disc, and said disc extends without said mechanism to permit operation thereof from outside said mechanism.

7. A photographic camera mechanism as set forth in claim 5 wherein said intermediate lever includes a projection and said flash controlling switch includes a spring-loaded lever resiliently urged into contact with said projection to provide said force.

8. A photographic camera mechanism as set forth in claim 5 wherein said flash-controlling switch includes a contact bearing link plate, a pivoted contact arm engaging said link plate, insulated linkage means operatively coupling said intermediate lever to said arm to selectively engage said arm with said contact portions of said link plate, and said preselectable means being operatively coupled to said plate to set the relative positions between said arm and said plate to govern the time of closure of switch.

9. A photographic camera mechanism as set forth in claim 5 wherein said flash-controlling switch means includes a contact arm and a cooperating contact is carried by a movable portion of said shutter mechanism to close said contacts and permit said flash circuit to be energized when said shutter mechanism arrives at its fully opened position.

10. A photographic camera mechanism as set forth in claim 9 wherein a contact lever is provided intermediate said arm and said flash-controlling switch to energize said circuit when said shutter mechanism reaches said fully opened position and, said contact lever includes steps disposed for cooperating with said preselectable means to govern the position of said contact lever to vary the position of said contact arm and time of closure of said contact.

11. A photographic camera mechanism as set forth in claim 10 wherein a pivoted rod is provided between said arm and said intermediate lever, said pivoted rod and said contact arm being spring loaded to contact each other and to resiliently urge said pivoted rod to bear against said intermediate lever.

References Cited in the file of this patent
UNITED STATES PATENTS

| | | |
|---|---|---|
| 1,332,173 | Froelich | Feb. 24, 1920 |
| 2,232,969 | Ranft | Feb. 25, 1941 |
| 2,238,115 | Johnson | Apr. 15, 1941 |
| 2,256,355 | Riddell | Sept. 16, 1941 |
| 2,319,086 | Riddell | May 11, 1943 |
| 2,511,201 | Fuerst | June 13, 1950 |
| 2,563,782 | Fuerst | Aug. 7, 1951 |
| 2,662,457 | Fairbank | Dec. 15, 1953 |